United States Patent [19]

Adler

[11] Patent Number: 4,750,848

[45] Date of Patent: Jun. 14, 1988

[54] INVOLUTE GEAR CUTTER

[76] Inventor: Harold Adler, 44 Huckleberry Hill, Lincoln, Mass. 01773

[21] Appl. No.: 896,890

[22] Filed: Aug. 14, 1986

[51] Int. Cl.[4] .............................................. B23F 5/20
[52] U.S. Cl. .................................... 409/41; 51/52 R; 51/56 G; 409/57
[58] Field of Search ...................... 409/38, 41, 51, 56, 409/57, 12, 15; 51/52 R, 56 G, 287

[56] References Cited

U.S. PATENT DOCUMENTS

| | | | |
|---|---|---|---|
| 559,011 | 4/1896 | Warren | 409/41 |
| 825,311 | 7/1906 | Flather | 409/56 |
| 1,609,331 | 12/1926 | Trbojevich | 409/12 |
| 1,797,227 | 3/1931 | Fickett | 409/39 |
| 1,953,970 | 4/1934 | Miller | 409/40 |
| 1,964,233 | 6/1934 | Uhlich | 51/95 GH |
| 2,486,020 | 10/1949 | Graf . | |
| 2,599,408 | 6/1952 | Miller | 409/38 |
| 2,659,277 | 11/1953 | Miller | 409/41 |
| 3,916,569 | 11/1975 | Wydler et al. | 51/33 W |
| 4,565,474 | 1/1986 | Charles | 409/51 |

Primary Examiner—Z. R. Bilinsky
Attorney, Agent, or Firm—Hamilton, Brook, Smith & Reynolds

[57] ABSTRACT

A gear cutter is provided as an accessory to a milling machine. A single gear cutting blade makes successive passes across a continuously rotating gear blank to cut a desired number of gear teeth. The cycle time of the cutting blade and the angular velocity of the gear blank are such that the gear blank increments a number of cut positions after each cut which number is greater than one and prime to the total number of gears to be cut. The accessory includes a pivotal and oscillating gear blank carriage. A blank on the carriage is rotated through change gears by a main timing shaft. The timing shaft also controls vertical movement of the cutting blade through a cam, a rack and pinion assembly and change gears. Further, through another cam the timing shaft controls retraction of the gear blank from the cutter blade. Proper selection of change gears enables cutting of gears of any pitch or diameter.

40 Claims, 5 Drawing Sheets

INVOLUTE GEAR CUTTER

BACKGROUND

Most gears have gear teeth with involute faces. An involute can be defined as the curve traced by the end of a taut string when it is unwound from a circle. Such gear teeth provide smooth operation and allow greater tolerance in the distance between the gear centers.

A characteristic of involute gears is that one involute gear can be used to form other gears of an interchangeable series of involute gears having a common pressure angle and thus common pitch. By illustration, an involute gear could be rolled against a plastic gear blank to mold the desired shape of gear teeth in the blank. A gear of a particular pitch can be used to form any other gear of the same pitch by proper selection of blank diameter and speed of rotation of the master gear and gear blank. Pitch can be defined as the number of teeth per inch of pitch diameter.

A more typical form of gear cutter which is based on the method described above utilizes an involute gear having cutting edges which are pulled axially across the peripheral face of a gear blank. As the cutter and blank are rotated the gear is formed by successive cuts by the cutter gear. That approach allows for very precise cutting of gears but suffers the drawback of requiring expensive equipment.

Another form of gear cutter utilizes a rotating cutter blade shaped as a tooth of a rack gear, a linear gear with flat faces. When a circular gear blank is rolled along the rotating rack gear cutter, the gear cutter forms involute faces of adjacent teeth. The blank is then incremented and another pass of the cutter blade is made to cut the next tooth space. A difficulty is in precisely incrementing the cutter blade and the work piece and controlling their relative speeds. To overcome that problem another system includes a series of cutter blades and the gear blank is rolled over those blades. A difficulty with such a system is in providing a large number of precisely positioned gear cutters for cutting uniform involute teeth about the gear blank.

Another form of gear cutter utilizes a rack gear cutter in the form of a worm gear and the blank is rolled past the worm gear. Again, there is difficulty in precisely manufacturing the worm gear cutter.

DISCLOSURE OF THE INVENTION

In a system embodying the present invention, a gear blank is rotated continuously on a blank axis. A single rack cutter rotates about a cutter axis displaced from and transverse to the blank axis. Periodically, in a predetermined timed relation to the blank angular velocity, the cutter blade is passed axially along the cutter axis past the rotating blank to cut between involute teeth to be formed on the blank. The cutter blade is moved at a velocity v equal to $\omega R$ where $\omega$ is the angular velocity of the blank and R is the pitch radius of the gear being cut by the rack cutter blade.

An axial oscillation may be imparted to the rotating gear blank to compensate for the circular shape of the cutter blade. To that end, a carriage on which the blank rotates may be driven along the blank axis by an eccentric drive. With rapid oscillation, the blank may be moved across the blade with each cut. Alternatively, the blank may be moved slowly so that a full cut is made after several passes of the blade. This approach even allows for cutting a stack of like gears. In order that the cutter blade may be mounted solely for vertical movement on a typical milling machine, the blank may rotate on a shaft which pivots away from the cutting blade. After each pass of the blade the blank is retracted to allow the blade to be returned to its starting position.

The duty cycle of the successive passes of the cutter blade is set relative to the angular speed of the blank such that the blank rotates a number of tooth positions greater than one for each cutter cycle. The incremented number of tooth positions is prime to the number of teeth to be cut in the blank. To that end, a common timing shaft may be used to drive the cutter blade along its axis, to retract the blank from the cutter blade after each pass of the blade and to rotate the gear blank. The cutter drive and blank retraction may be through cams mounted on the timing shaft.

In a preferred system, two sets of gears may be changed to set timing of the gear cutter for cutting gears of various pitches and pitch diameters. One set of change gears sets the speed of the axial movement of the cutter blade past the gear blank, and another set of gears sets the blank rotation speed. The first set of gears may be driven through a rack and pinion assembly which in turn is driven by a cam such that the cutter blade passes the gear blank once with each rotation of the cam on the timing shaft. The second set of gears may include a change gear, on the pivot axis of the blank carriage, which drives the blank shaft through additional gears. That change gear is itself driven by a change gear on the timing shaft. An idler on a pivotal arm between the two change gears allows for changes in size of the change gears.

BRIEF DESCRIPTION OF THE DRAWINGS

The foregoing and other objects, features, and advantages of the invention will be apparent from the following more particular description of a preferred embodiment of the invention, as illustrated in the accompanying drawings in which like reference characters refer to the sam parts throughout the different views. The drawings are not necessarily to scale, emphasis instead being placed upon illustrating the principles of the invention.

DESCRIPTION OF PREFERRED EMBODIMENTS

Figure 4:
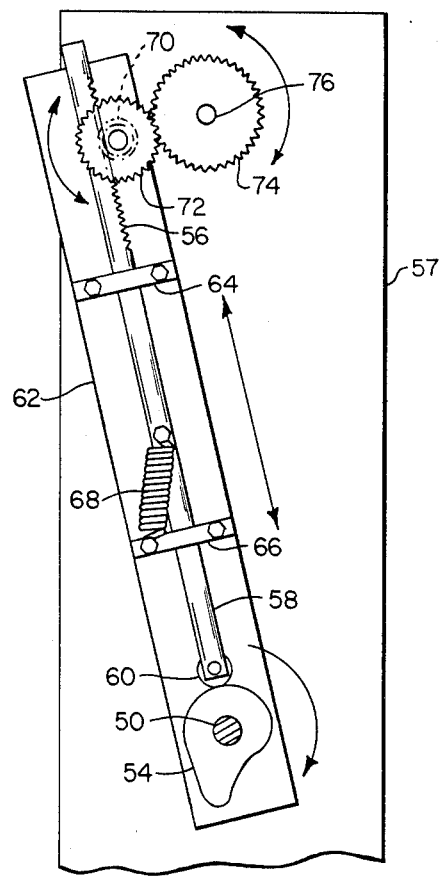
FIG. 4 is a right side view of the gear cutting accessory in the system of FIG. 1 showing the mechanism for vertically driving the cutter blade.

Although principles of the present invention can be utilized in a free standing gear cutter, the system has been implemented as an accessory to be mounted to a standard milling machine. One such machine is that sold under the trademark "Bridgeport". A standard machine includes a table 12 mounted for three dimensional rectilinear movement. The table 12 can be moved to the left and right by a screw 15 on a table 14 by means of a crank 16 or 17. The table 14 can be moved fore and aft by a crank 18. The tables can be moved together vertically along a screw 20 be means of a crank 22. The table 12 is intended for mounting of a work piece. A rotating tool, in this case a gear cutter blade 24, is mounted on a shaft 26 and rotated by an electric motor 28. The drive shaft assembly can be raised or lowered along the axis of the drive shaft 26, usually by means of a handle positioned to the side of the assembly. In the present system, however, the handle has been replaced by a shaft 30 having universal couplings 32 and 34. Return springs 36 and 38 pull the assembly up to maintain a cam follower 60 against a cam 54 (FIG. 4). The shaft 30 comprises two telescoping lengths 31 and 33. Length 31 is driven through a pin 35 in a slot 37.

Figure 1:
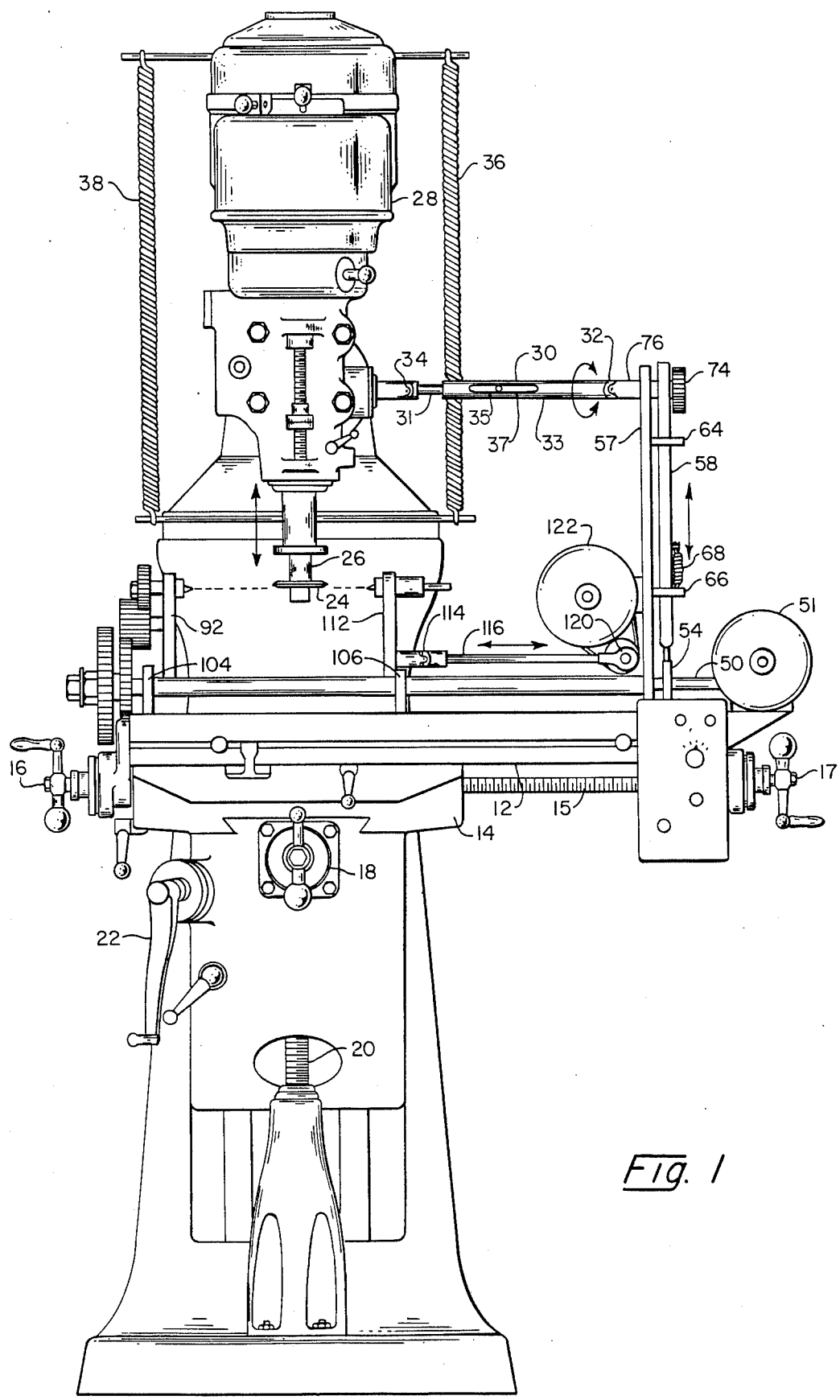
FIG. 1 is a front view of a milling machine modified to incorporate the present invention.
Figure 2:
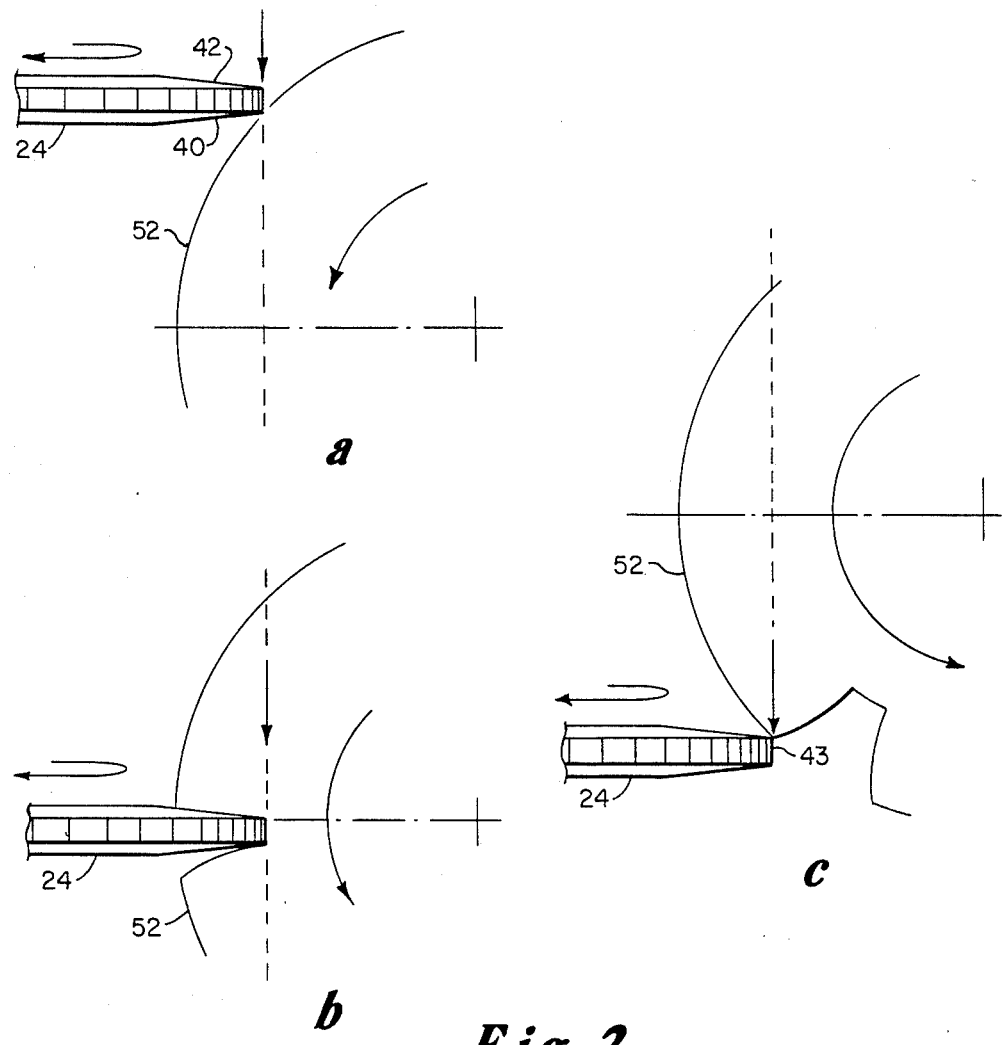
FIG. 2 illustrates a sequence of cutter blade movement relative to a gear blank to cut involute gear teeth.

The present invention is based on an understanding of the fact that the recess between involute gear teeth can be formed by a rack gear moving past the gear blank at the same speed as the gear blank along its pitch circle. This is illustrated in FIG. 2 where the rotating gear cutter 24 can be seen to have straight cutting edges 40 and 42. Those faces are angled from the horizontal to provide a desired pressure angle characteristic of a family of gears. Typically, a pressure angle of 20 degrees is desired and faces of a rack gear in the gear family and of the rack cutter blade are 20 degrees from the horizontal. Any number of gear teeth can be cut in the gear blank with successive passes of the gear cutter relative to the blank. It is the means for providing the precise relative timing of the cutter blade and gear blank in successive passes to which the present invention is directed.

The cutter blade may have cutting teeth or it may be a grinding wheel with an abrasive surface. The latter is permissible because of the high speed of blade rotation possible in this system. In a typical approach, a toothed blade would be used to make rough cuts and the gear would be finished using a grinding wheel.

The width of the peripheral surface 43 between the flat faces 40 and 42 is the land of the cutter. For each diametral pitch, the amount of land is set to comply with a tooth profile of one of various standards such as those agreed to by the American Gear Manufacturer's Association. However, a wider land can be simulated by making a second pass with the table 14 displaced vertically. Thus, one cutter with a minimum land could, for example, cut all 20 degree pressure angle gears. A more convenient approach, however, is to provide a set of cutters which provides one cutter for each common diametral pitch of each pressure angle. Other variations in the cutter blade might be made. For example, the pressure angle could be different on both sides of the cutter blade to generate teeth that might be buttressed to be stronger in one direction of drive rotation.

The number of teeth required could be used to determine the circumferential distance between the teeth, and the gear blank could simply be incremented that amount after each pass of the cutting blade. However, such an approach would present the problem of obtaining the desired precise relative speeds of the cutter blade and blank after each increment of the blank along with the problem of precisely incrementing the blank.

Figure 3:
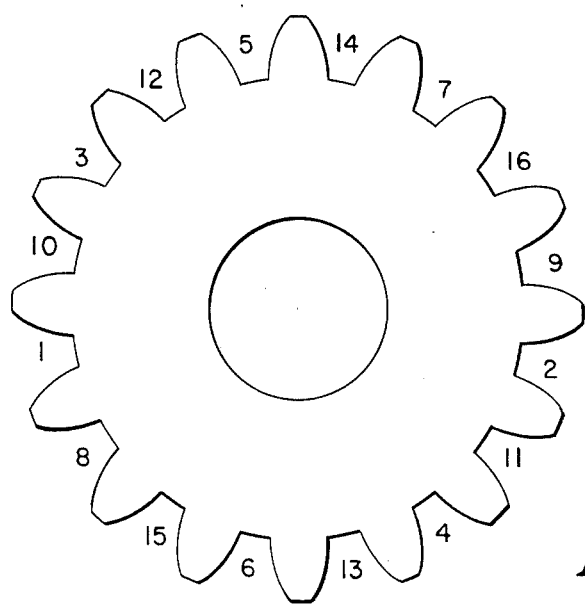
FIG. 3 illustrates the incrementing of gear positions during the cutting operation in accordance with principals of the invention.

In accordance with the present invention, the blank is rotated continuously. Because of the time required to return the cutter to a position above the blank ready for the next cutting pass, no attempt is made to successively cut adjacent recesses in the gear blank. Rather, the timing of cutter blade movement is set such that it passes the gear blank successively at nonadjacent recess positions. The number of positions which are skipped is selected such that the same number of positions can be skipped after each cut and the total number of desired cuts can be made in as many passes of the cutter. To that end, it has been determined that by jumping a number of positions after each cut, which number is prime to the number of desired cuts, the desired result is obtained. For example, 16 teeth can be made by incrementing cut positions by an amount equal to 3, 5, 7, 9, 11, 13, or 15, each of which is prime to 16. That is, none of those numbers has a common denominator with 16. Selecting 7 as an example of the increment number, the cutting of a 16 tooth blade is illustrated in FIG. 3. Each successive cut of the gear is labelled with a number. The first cut, for example, is made at position 1. Then, by incrementing through seven positions of desired cuts, the second cut is made at location 2. By incrementing another seven positions, a third cut is then made at position 3 and so on. From FIG. 3, it can be seen that, by successively incrementing seven positions after each cut, the 16 required teeth are cut after 16 passes of the cutting blade. Utilizing the approach of incrementing the blank by a number of positions greater than one which is prime to the desired number of cuts, the blank can be continuously rotated while still allowing time for the single cutter blade to be repositioned for its next pass.

It can also be recognized that after the sixteenth cut the next cut position is again the first position. Thus, a first pass of each of the 16 positions can be made and then, with continued incrementing by the single increment number, successive passes of the cut positions can be made for deeper cutting into the blank or alternatively for a relatively stress-free finishing cut. As already noted, the initial cutter blade may be replaced with a grinding wheel for the finish cuts.

The accessory which allows for the precise multiple position increments described above and developed as an accessory for a milling machine will now be described with reference to FIGS. 1, 4, 5, 6 and 7. The entire accessory is mounted to the table 12.

Three timing functions of the accessory are served by a single timing shaft 50 driven by a motor 51. That shaft controls the speed of rotation of a gear blank 52, retraction of that gear blank to allow return of the cutting blade 24, and the speed and duty cycle of the vertical movement of the cutting blade 24.

As previously noted, the vertical movement of the tool 24 is typically controlled by an arm on a shaft which has been replaced by the shaft 30. Thus, vertical movement of the gear cutter blade 24 can be precisely controlled by rotation of the shaft 30. That rotation is accomplished by the assembly shown in FIG. 4. A cutter drive cam 54 is mounted to the timing shaft 50. That cam drives a rack gear 56 at the end of a bar 58 by a cam follower 60. The bar 58 is retained for linear movement along a support 62 by bearings 64 and 66. The cam forces the bar 58 upward against a return spring 68 and the springs 36 and 38. The rack gear 56 drives a pinion 70. A change gear 72 is mounted on the pinion shaft and in turn drives a second change gear 74. That change gear in turn drives a shaft 76 which is coupled to the shaft 30 through a universal coupling 32.

Thus, the vertical position of the gear cutter blade 24 directly follows the cam 54. The bar 58 rises at a steady rate to move the cutter blade down at a constant speed and then drops rapidly to return the cutter blade to its initial upper position. The speed of movement is determined by the cam 54 and the relative sizes of the gears 70, 72 and 74. As will be described below, the change gears 72 and 74 are selected to drive the gear cutter 24 at the proper vertical speed required for proper cutting of a gear of desired pitch and diameter. The entire bar carrier 62 is pivotable about the timing shaft 50 such that it can be shifted to allow for different sizes of change gears and then be locked into place.

Figure 5:
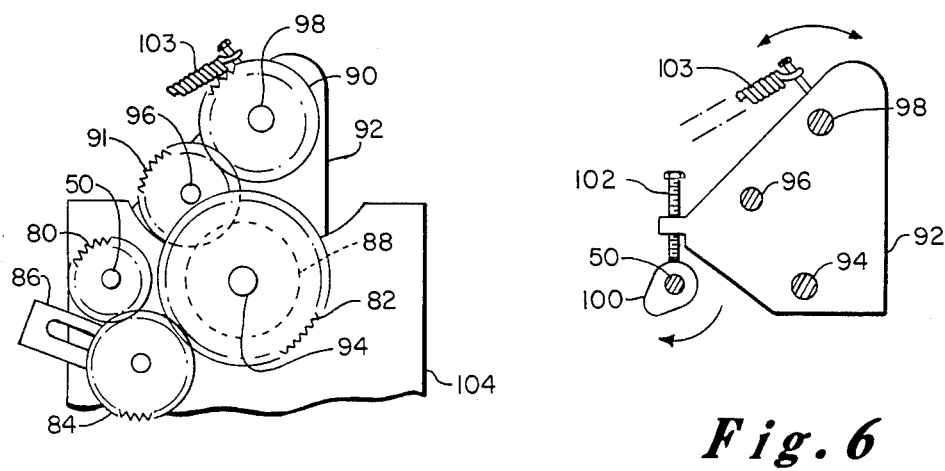
FIG. 5 is a left side view of the accessory in the system of FIG. 1 showing the blank drive gears.
Figure 7:
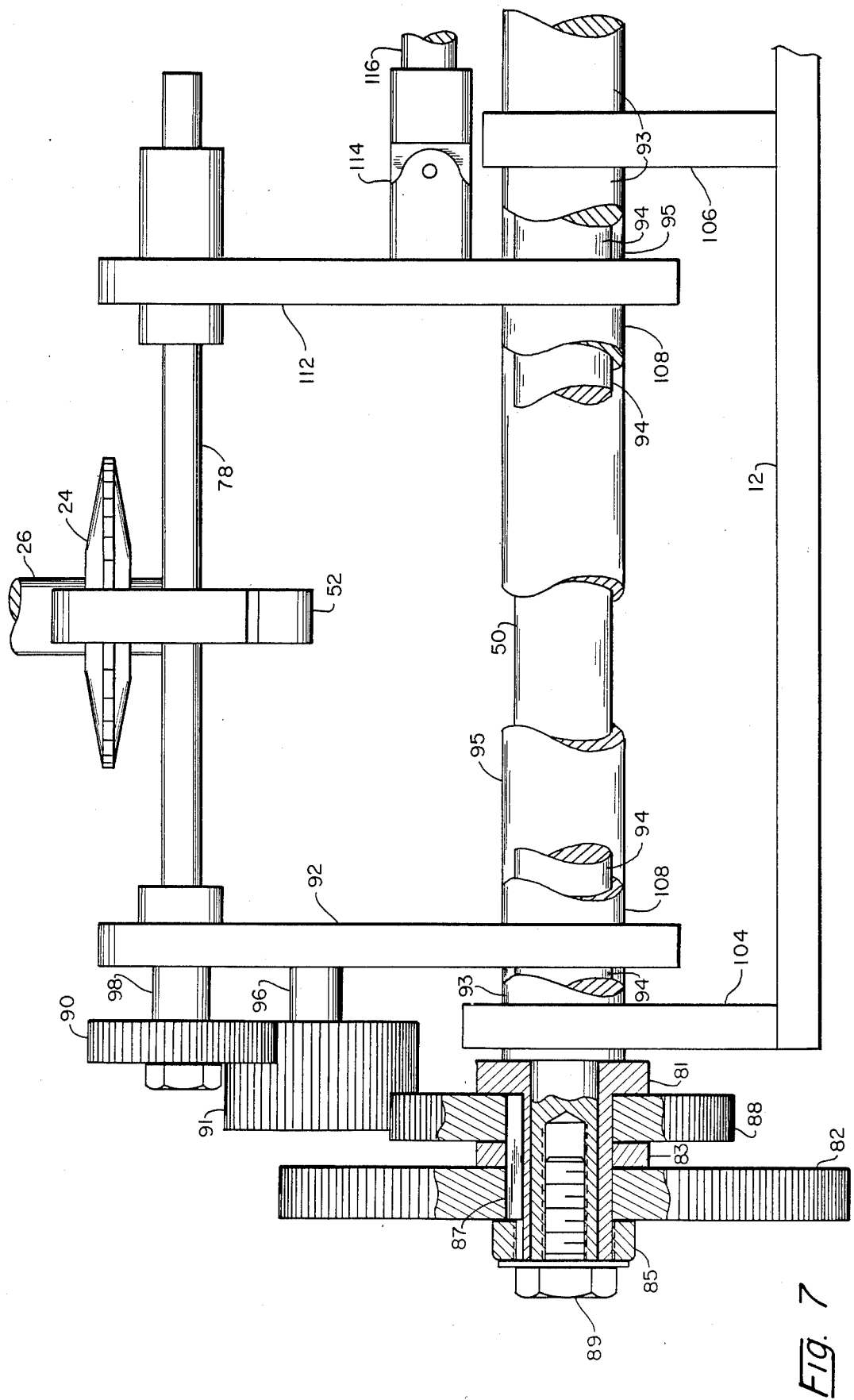
FIG. 7 is a front view, partially broken away, of the blank carriage and drive gears.

Rotation of the gear blank 52 on a shaft 78 is controlled by the assembly illustrated in FIGS. 5 and 7. The timing shaft 50 drives a third change gear 80 which in turn drives a fourth change gear 82 through an idler 84. The idler is mounted on a slotted, pivotal arm 86 to allow for different sizes of change gears. Another gear 88 is mounted to the same shaft 94 as the change gear 82 and drives a gear 90 through an idler 91. The gears 82 and 88 are mounted to the stationary shaft 94 on a bushing 81 which is free to rotate on shaft 94. The gears are spaced by a spacer 83 and the assembly is clamped together by a nut 85 threaded onto the bushing. A key 87 prevents rotation of the two gears relative to each other. The bushing is retained on the shaft 94 by a bolt 89.

The gears 88 and 90 are of the same diameter. The shafts 94, 96 and 98 on which the gears 88, 90 and 91 are mounted are carried in fixed relationship relative to each other by a pivot plate 92. The shaft 78 to which the gear blank is mounted is coupled to rotate with the shaft 98. Thus, the angular velocity of the gear blank can be set by proper selection of the change gears 80 and 82.

Figure 8:
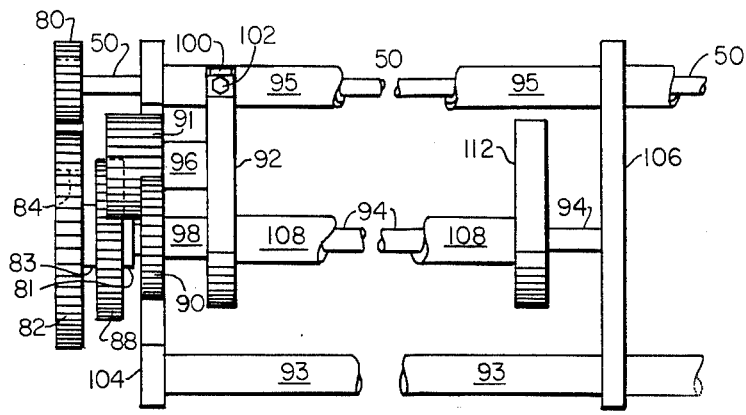
FIG. 8 is a plan view of the blank carriage and drive gears.

The shaft 94 is suspended on support walls 104 and 106 mounted to the table 12 (FIGS. 7 and 8). The support walls are also rigidly secured to each other by tubes 93 and 95 in front of and behind shaft 94. The drive shaft 50 runs through the rear tube 95.

The plate 92 is an end plate of a blank carriage which includes an opposite end plate 112 and a tube 108 all rigidly secured to each other. The blank carriage is pivotally supported on shaft 94 by bearings in plates 92 and 112. The carriage is also free to move axially along the shaft 94. The gear blank 52 is supported on a tapered arbor 78 which is clamped to and driven by the shaft 98. Gears 90 and 91 also reciprocate with the tube 108 and plates 92 and 112; thus, the gear 91 is of double thickness to maintain the driving relationship between gears 88 and 91 as the gear 91 reciprocates.

Figure 6:
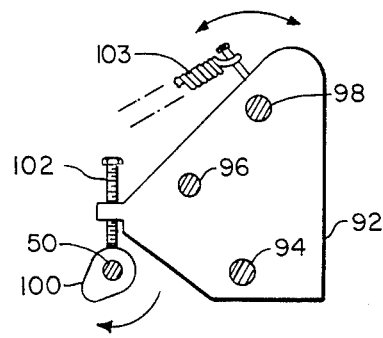
FIG. 6 is a sectional view of the gear cutting accessory illustrating the cam for pivoting the blank carriage.

To allow for retraction of the gear blank after each pass of the gear cutter blade so that the cutter blade can be returned to its uppermost position, the blank carriage is mounted to be pivoted about the pivot shaft 94 to which the gears 82 and 88 are mounted. FIG. 6 shows a side view of the plate 92 behind the gears. A retracting cam 100 is mounted to the timing shaft and, once each revolution of the shaft, the cam drives an adjustable follower 102. The follower causes the plate 92 to pivot about the pivot shaft 94 against a spring 103. In pivoting, the plate 92 causes the entire blank carriage to pivot and moves the shaft 98.

If the gear blank were axially fixed as the cutter blade cut into the blank, the cut would follow the curvature of the blade and thus cut deeper towards the center of the blank than toward the side faces of the blank. To avoid that curvature in the cut, the gear blank in the present system is caused to oscillate axially as it is rotated and as the cutter blade is passed by the blank to make the cut. To that end, the pivotal work carriage is axially movable along the shaft 94.

The carriage is driven back and forth axially through a universal coupling 114 and a connecting arm 116. The connecting arm 116 is driven through a ball joint 118 by an eccentric shaft 120. The eccentric is in turn driven by the motor 122 which is mounted to the table 12. The work carriage is oscillated at a rate of about thirty oscillations per pass of the cutter blade.

The overall operation of the system can be seen as follows. The gear blank 52 is continuously rotated by the timing shaft through the gears shown in FIG. 5. The gear blank is also continuously oscillated by the motor 122. With each revolution of the timing shaft 50, the gear cutter blade 24 is brought down past the gear blank at a constant velocity by means of the cam 54 acting through the gears shown in FIG. 4. After each downward pass of the cutter blade, the blade is rapidly returned to its uppermost position by operation of the cam 54. The gear blank is pivoted to a retracted position determined by the retracting cam 100 which is also mounted to the timing shaft to allow the cutter blade to be returned to its uppermost position.

In order to utilize the approach illustrated in FIG. 3 of incrementing the cuts by a number of positions which is prime to the number of total cuts, the angular velocity $\omega$ of the gear blank must be precisely set relative to the duty cycle of the cutter blade. This is accomplished by the change gears 80 and 82. Then, with the angular velocity of the gear blank set, and for a particular pitch radius R of the finished gear, the vertical velocity v of the cutter blade must be set at $\omega R$ in order to match the velocity of the cutter blade with the vertical velocity of the blank at its pitch diameter. The velocity of the cutter 24 is set by proper choice of the change gears 72 and 74.

There are two sets of change gears. In a first set, gear 80 driving gear 82, the gear ratio is simply the fraction of a revolution that the blank turns for successive tooth cuts. In the example of FIG. 3, this ratio is 7/16, every seventh tooth of a 16-tooth gear. This result comes from the fact that gear 80 is fastened to shaft 50, which contains the master cam and thus turns one revolution per cutting cycle, while the blank turns through the same angle as gear 82, 7/16 of a revolution per cutting cycle.

Another way to say it is that the denominator Y of the gear ratio X/Y in its lowest terms is the number of teeth desired in the blank, 16, and the numerator, X, is a number prime to the denominator that yields the desired fraction of a turn of the blank between successive cuts. A practical range of values for the fraction X/Y being from ¼ to ½.

With the gear ratio established, a pair of gears of practical and convenient sizes is selected. In this instance, 21=3X teeth to 48=3Y maintains the 7/16 ratio.

The second set of change gears, gear 72 driving gear 74, determines the linear speed and the stroke of the cutter as it descends through the blank cutting a tooth space. Call this gear ratio in its lowest terms A/B.

Recalling that the diametral pitch of an interchangeable series of gears is a measure of the number of teeth per inch of pitch diamter, it is seen that any gear with a given diametral pitch will be one-half the size of a gear with the same number of teeth but double the diametral pitch; in other words, the size of the gear in general is inversely proportional to its diametral pitch. This results in the property that B, the denominator, can be equal to the diametral pitch of the gear to be cut provided that the master cam can be sized properly.

The numerator A is required to be proportional to the rotational speed of the blank. This speed in turn is proportional to X, the skip-tooth value. By selecting the rise of the master cam to be ¼ inch per radian of rotation ($\pi/2$ inches per revolution), it is possible to specify that $A=2X$.

In short, B is numerically equal to the diametral pitch of the gear to be cut and A is double the numerator X of the fraction X/Y in its lowest terms. If we assume the desired gear to be of 20 diametral pitch, $A/B = (2 \times 7)/20 = 14/20$. Actual gears could be 28/40, for example.

It is important to select the amount of rise of the master cam per radian to permit A to be an integral multiple (in this case 2) of X while at the same time permitting B to be an integral multiple (in this case 1) of the diametral pitch. If the proper care is not taken on the rise of the master cam, it would be difficult to select gears A and B to cut standard gears.

The proper relationship of the four gears can also be derived as follows. In the present system, the rack and pinion 56, 70 has been selected to match that provided in the milling machine to vertically drive the drive shaft 26. Therefore, the drop of the cutter blade is proportional to the gear ratio A/B, where A is the number of teeth in the gear 72 and B is the number of teeth in the gear 74, and proportional to the rise of the rack 56 per radian of revolution of the drive shaft 50 determined by the cam 54. In the present system, the cam provides a constant $K=¼$ inch rise per radian of revolution through 280 degrees of the system cycle. The drop of the cutter blade must be matched to the rotation of the work which is determined by the gear ratio X/Y, where X is the number of teeth in gear 80 and Y is the number of teeth in gear 82. Thus, the vertical velocity v of the cutter blade must equal $\omega R$ where $\omega$ is the angular velocity and R is the pitch radius of the gear being cut. From that relationship:

$$R = \frac{v}{\omega} = \frac{\text{drop of cutter}}{\text{radian of rotation}} = \frac{A/B \times 1/4}{X/Y} \quad (1)$$
$$= \frac{A}{B} \times \frac{1}{4} \times \frac{Y}{X}$$

The pitch radius R, on the other hand, is equal to the ratio of the number of teeth W to be cut to twice the diametral pitch P of the work to be cut. The diametral pitch is the number of teeth per inch of pitch diameter. Thus:

$$R = \frac{W}{2P} = \frac{A}{B} \times \frac{1}{4} \times \frac{Y}{X} \quad (2)$$

The relationship of equation (2) may be established in the disclosed system by the following steps:
1. Set $Y=W$
2. Set X prime to Y and (for efficiency) approx ⅓ Y.
3. Set $B=P$
4. Set $A=2X$
5. Now keeping ratio X/Y constant select practical sizes.
6. Keeping the ratio A/B constant, selected practical sizes.

By setting X prime to Y the proper skip for cutting of all gear teeth is provided. By selecting X, Y, A and B as indicated, the equality of equation (2) is maintained:

$$\frac{W}{2P} = \frac{2X}{P} \times \frac{1}{4} \times \frac{W}{X} \quad (3)$$
$$= \frac{W}{2P}$$

While the invention has been particularly shown and described with reference to a preferred embodiment thereof, it will be understood by those skilled in the art that various changes in form and details may be made therein without departing from the spirit and scope of the invention as defined by the appended claims.

I claim:

1. Gear cutting apparatus for cutting involute gears comprising:
   means for continuously rotating a gear blank about a bland axis at an angular velocity;
   means for rotating a cutter blade about a cutter axis displaced from and transverse to the blank axis; and
   means for periodically, in a predetermined timed relation to the blank angular velocity, passing the cutter blade axially along the cutter axis pass the rotating blank to cut between gear teeth with each pass of the cutter blade pass the continously rotating gear blank, the gear blank rotating continously through successive passes of the cutter blade at different tooth locations about the gear blank.

2. Gear cutting apparatus as claimed in claim 1 further comprising means for oscillating the gear blank along the blank axis as the blank is rotated, the gear blank oscillating with each pass of the cutter blade.

3. Gear cutting apparatus as claimed in claim 2 wherein the means or oscillating comprises an axially movable carriage which supports a rotating shaft to which the gear blank is mounted.

4. Gear cutting apparatus as claimed in claim 3 wherein the carriage is driven by means of a connecting ar driven through an eccentric.

5. Gear cutting apparatus as claimed in claim 3 wherein the carriage is pivotable as the blank rotates and oscillates to retract the gear blank from the cutter blade.

6. Gear cutting apparatus as claimed in claim 1 wherein the angular velocity of the gear blank relative to the cutter blade duty cycle is such that the blank rotates a number of tooth positions greater than one for each cutter blade cycle, which number is prime to the total number of teeth to be cut.

7. Gear cutting apparatus as claimed in claim 6 comprising a common timing shaft for driving the cutter blade along the cutter axis, for periodically retracting the gear blank as the cutter blade is returned to an initial position and for driving the gear blank.

8. Gear cutting apparatus as claimed in claim 7 further comprising a cam mounted to the timing shaft for driving the cutter blade along its cutter axis and a retracting cam mounted to the timing shaft for retracting the gear blank.

9. Gear cutting apparatus as claimed in claim 7 comprising a first set of change gears for setting the velocity of the cutter blade along the cutter axis and a second set of change gears for setting the angular velocity of the gear blank.

10. Gear cutting apparatus as claimed in claim 9 wherein the cutter blade cycles through one cutting operation per revolution of the timing shaft.

11. Gear cutting apparatus as claimed in claim 9 wherein the first set of change gears is driven by a rack and pinion which is driven by a cam mounted to the timing shaft.

12. Gear cutting apparatus as claimed in claim 9 wherein the blank carriage is pivotable on a pivot axis to retract the gear blank from the cutter axis and the gear blank is driven through a gear on the pivot axis, an idler gear, and a gear on the blank axis.

13. Gear cutting apparatus as claimed in claim 12 wherein a change gear is mounted on the pivot axis.

14. Gear cutting apparatus as claimed in claim 13 wherein the change gear on the pivot axis is driven by an idler on a pivotal arm to allow for different sizes of change gears.

15. Gear cutting apparatus as claimed in claim 12 wherein the gear blank is mounted for axial oscillation on an axially movable carriage.

16. Gear cutting apparatus as claimed in claim 6 wherein the cutter blade is a rack cutter blade and the blade is passed axially along the cutter axis to cut the gear blank at a velocity equal to $\omega R$, where $\omega$ is the angular velocity of the gear blank and $R$ is the pitch radius of the gear being cut.

17. Gear cutting apparatus for cutting involute gears comprising:
means for rotating a gear blank about a blank axis at an angular velocity $\omega$;
means for rotating a rack cutter blade about a cutter axis displaced from and transverse to the blank axis;
means for pssing the cutter blade axially along the cutter axis past the rotating blank at a velocity equal to $\omega R$ where $R$ is the pitch radius of the gear being cut by the rack cutter blade; and
means for oscillating the gear blank along the blank axis with each pass of the cutter blade past the gear blank.

18. Gear cutting apparatus comprising:
means for rotating a cutter blade about a cutter axis;
a rotating timing shaft;
cutter drive means including a cam on the timing shaft and a first set of change gears for periodically passing the cutter blade axially along the cutter axis past the rotating blank at a predetermined velocity to cut between the gear teeth with each pass of the cutter blade;
a carriage for mounting a gear blank for rotation about a blank axis displaced from and transverse to the cutter axis;
blank drive means including a second set of change gears driven by the timing shaft for rotating a gear blank at an angular velocity relative to the cutter blade duty cycle such that the blank rotates a number of tooth positions greater than one for each cutter blade cycle, which number is prime to the total number of teeth to be cut;
retracting means including a cam on the timing shaft for pivoting the blank carriage to retract the gear blank away from the cutter axis after each cutting pass of the cutter blade; and
means for reciprocating the blank carriage such that the gear blank oscillates along the blank axis as the blank is rotated.

19. Gear cutting apparatus as claimed in claim 18 wherein the first set of change gears includes a first gear having A teeth which drives a second gear having B teeth and the second set of change gears includes a third change gear having X teeth which drives a fourth change gear which has Y teeth and $$\frac{W}{2P} = \frac{A}{B} K \frac{Y}{X}$$

where W is the number of teeth to be cut in a gear, P is the diametral pitch of the gear being cut and K is a constant to which the axial displacement of the cutter blade is proportional.

20. Gear cutting apparatus for cutting involute gears comprising:
means for continuously rotating a gear blank about a blank axis at an angular velocity;
means for rotating a cutter blade about a cutter axis displaced from and transverse to the blank axis;
means for periodically, in a predetermined timed relation to the blank angular velocity, passing the cutter blade axially along the cutter axis past the rotating blank to cut between gear teeth with each pass of the cutter blade past the continuously rotating gear blank; and
means for oscillating the gear blank along the blank axis as the blank is rotated.

21. Gear cutting apparatus as claimed in claim 20 where the means for oscillating comprises an axially movable carriage which supports a rotating shaft to which the gear blank is mounted.

22. Gear cutting apparatus as claimed in claim 21 wherein the carriage is driven by means of a connecting arm driven through an eccentric.

23. Gear cutting apparatus as claimed in claim 21 wherein the carriage is pivotable as the blank rotates and oscillates to retract the gear blank from the cutter blade.

24. Gear cutting apparatus for cutting involute gears comprising:
means for continuously rotating a gear blank about a blank axis at an angular velocity;
means for rotating a cutter blade about a cutter axis displaced from and transverse to the blank axis;
means for peroidically, in a predetermined timed relation to the blank angular velocity, passing the cutter blade axially along the cutter axis past the rotating blank to cut between gear teeth with each pass of the cutter blade past the continuously rotating gear blank; and
a common timing shaft for driving the cutter blade along the cutter axis, for periodically retracting the gear blank as the cutter blade is returned to an initial position and for driving the gear blank.

25. Gear cutting apparatus as claimed in claim 24 further comprising a cam mounted to the timing shaft for driving the cutter blade along its cutter axis and a retracting cam mounted to the timing shaft for retracting the gear blank.

26. Gear cutting apparatus as claimed in claim 24 comprising a first set of change gears for setting the velocity of the cutter blade along the cutter axis and a second set of change gears for setting the angular velocity of the gear blank.

27. Gear cutting apparatus as claimed in claim 26 wherein the cutter blade cycles through one cutting operation per revolution of the timing shaft.

28. Gear cutting apparatus as claimed in claim 26 wherein the first set of change gears is driven by a rack and pinion which is driven by a cam mounted to the timing shaft.

29. Gear cutting apparatus as claimed in claim 26 wherein the blank carriage is pivotable on a pivot axis to retract the gear blank from the cutter axis and the gear blank is driven through a gear on the pivot axis, an idler gear, and a gear on the blank axis.

30. Gear cutting apparatus as claimed in claim 29 wherein a change gear is mounted on the pivot axis.

31. Gear cutting apparatus as claimed in claim 30 wherein the change gear on the pivot axis is driven by an idler on a pivotal arm to allow for different sizes of change gears.

32. Gear cutting apparatus as claimed in claim 29 wherein the gear blank is mounted for axial oscillation on an axially movable carriage.

33. Gear cutting apparatus for cutting involute gear comprising:
means for continuously rotating a gear blank about a blank axis at an angular velocity;
means for rotating a cutter blade about a cutter axis displaced from and transverse to the blank axis; and
means for periodically, in a predetermined timed relation to the blank angular velocity, causing relative movement between the cutter blank and the rotating blank to cut between gear teeth with each relative pass of the cutter blade past the continuously rotating gear blank, the gear blank rotating continuously through successive passes of the cutter blade at different tooth locations about the gear blank.

34. Gear cutting apparatus as claimed in claim 33 wherein the angular velocity of the gear blank relative to the duty cycle of the relative movement of the cutter blade relative to the gear blank is such that the blank rotates a number of tooth positions greater than one for each cycle of relative movement, which number is prime to the total number of teeth to be cut.

35. Gear cutting apparatus as claimed in claim 33 comprising a common timing shaft for rotating the gear blank and for causing the relative movmeent between the cutter blade and the gear blank.

36. Gear cutting apparatus as claimed in claim 35 wherein the relative movement of the cutter blade and gear blank is caused by a cam mounted to the timing shaft which drives the cutter blade in a linear movement.

37. Gear cutting apparatus as claimed in claim 36 further comprising a retracting cam mounted to the timing shaft for pivoting the gear blank from the cutter blade as the cutter blade is returned to an initial position, the gear blank pivoting about the axis of a gear driving the gear blank.

38. Gear cutting apparatus as claimed in claim 37 further comprising means for oscillating the gear blank along its axis while maintaining drive to the gear blank.

39. Gear cutting apparatus as claimed in claim 33 comprising means for pivoting the gear blank from the cutter blade as the cutter blade is returned to an initial position, the gear blank pivoting about the axis of a gear driving the gear blank.

40. Gear cutting apparatus as claimed in claim 39 further comprsing means for oscillating the gear blank along its axis while maintaining drive to the gear blank.

* * * * *